United States Patent [19]
Masuda

[11] Patent Number: 5,262,746
[45] Date of Patent: Nov. 16, 1993

[54] RIBBON COIL FOR MOTOR WINDING

[75] Inventor: Susumu Masuda, Yaizu, Japan

[73] Assignee: Victor Company of Japan, Ltd., Yokohama, Japan

[21] Appl. No.: 882,034

[22] Filed: May 13, 1992

[30] Foreign Application Priority Data

May 16, 1991 [JP]  Japan .............................. 3-044133[U]

[51] Int. Cl.⁵ ............................................. H01F 15/10
[52] U.S. Cl. ...................................... 336/192; 29/605; 310/71; 310/208; 336/232
[58] Field of Search ....................... 336/192, 223, 232; 310/208, 71; 29/605

[56] References Cited

U.S. PATENT DOCUMENTS

| | | | |
|---|---|---|---|
| 2,850,707 | 9/1958 | Wroblowski et al. | 336/232 |
| 3,467,931 | 9/1969 | Dutton | 336/232 |
| 3,787,766 | 1/1974 | Graefuitz et al. | 336/192 |
| 4,507,637 | 3/1985 | Hayashi | 336/192 |

FOREIGN PATENT DOCUMENTS 2-47806  2/1990  Japan .

Primary Examiner—Thomas J. Kozma
Attorney, Agent, or Firm—Michael N. Meller

[57]     ABSTRACT

The specification discloses a ribbon coil for a motor winding which is generally constructed as a roll having an inside wall and an outside wall by spirally winding a ribbon wire. The ribbon wire comprises a narrow strip of a metal foil layer, an insulation layer coated on the surface of the metal foil layer and a fusible layer on the surface of the insulation layer. The roll is solidified to form itself by melting then curing the fusible layer with a solvent or a hot air while the ribbon wire is being spirally wound. At least, a beginning portion of the ribbon coil is folded, and a extension of the folded portion is bent along the inner wall of the roll so that the beginning end potion forms a "S" shape bend in a space surrounded by the inner wall of the roll. The "S" shape bend is provided with a electrical terminal which is formed by removing the insulation layer and the fusible layer prior to the coil winding.

4 Claims, 2 Drawing Sheets

RIBBON COIL FOR MOTOR WINDING

BACKGROUND OF THE INVENTION

1. Field of the Invention

The present invention relates to improvements of a ribbon coil for a motor winding and it particularly relates to improvements of a wire end formation of the ribbon coil.

2. Description of the Related Art

Presently, a DC (Direct Current) motor, especially a brushless motor of coreless type, is widely used as a driving motor for driving a head cylinder and a capstan in a video apparatus and an audio apparatus to prevent noise derived from a brush and commutator system, and to prevent an irregular rotation due to the magnetic attraction and repulsion caused between the cores and magnets of the motor. In such a coreless motor, a ribbon coil is often used as a driving coil for the reason of easiness in the assembly process and for miniaturization of the motor.

FIG. 1 is a perspective view of a ribbon coil in a prior art. FIG. 2 is a perspective view of a ribbon coil in another prior art.

Generally, a ribbon coil 50 is constructed as a roll 54 by spirally winding a ribbon wire made of a narrow strip of metal foil 51 on which an insulation layer and a fusible layer 51a is coated in order, and the distal ends 52, 53 of the ribbon coil 50 are stripped by removing the insulation layer and the fusible layer 51a to form electrical terminals 52a, 53a for solderring lead wires (not shown), as shown in FIG. 1. However, as shown in FIG. 2, the ribbon coil 55 may be constructed in such a manner that wire ends 56, 57 of the ribbon coil 55 is pulled out of the roll 54 and is twisted 90 degrees in order to facilitate a subsequent wire end process. The wire end process includes a forming of electrical terminals 58, 59 on the wire ends 56, 57 of the ribbon coil 50 by removing the insulation layer and the fusible layer with a file and a cutter so that the wire ends 56, 57 are prepared for a subsequent solderring.

In the assembly process of the brushless motor, a plurality of the ribbon coils are disposed in a plane so as to form a circular stator (not shown), and a rotor having a plurality of permanent magnets (not shown) are rotatably provided in a manner that the permanent magnets face the ribbon coils.

In the prior art of FIG. 1, the wire ends 52, 53 of the ribbon coil 50 are not pulled out of the roll 54, in other words, they are adhered to the roll 54, so that it is difficult to form the electrical terminal 53a by using a cutter or a file in a small space 54a surrounded by the inside wall of the roll 54, this degrades a manipulating efficiency of the wire end process. Further, in solderring the lead wires, the electrical terminals 52a, 53a transfers heat easily to the roll 54, so that a solderring temperature is liable to change and is difficult to be controlled, which makes an electrical connection at a solderring joint unreliable. Furthermore, the adherence of the wire ends 52, 53 to the roll 54 poses a difficulty of determinating the front and back sides of the ribbon coil 50, which leads an erroneous mounting of the ribbon coil in the assembly process of the DC motor.

In the prior art of FIG. 2, the wire ends 56, 57 of the ribbon coil 55 pulled out of the roll 54, eliminate the above problems. However, it is difficult to cut the wire ends 56, 57 at desirable lengths and to remove the insulation layer and fusible layer therefrom. Especially, it is very difficult to manipulate the wire end 57 and to form the electrical terminal 59 within the small space 54a because available lengths of the wire ends 56, 57 are quite limited when the ribbon coil 55 is intended to be designed and made very small

SUMMARY OF THE INVENTION

Accordingly, a general object of the present invention is to provide a ribbon coil in which the above disadvantages have been eliminated.

A more specific object of the present invention is to provide a ribbon coil which is small, reliable and efficient in the assembly process.

Another and more specific object of the present invention is to provide a ribbon coil for a motor which ribbon coil is generally constructed as a roll of ribbon wire having an inside wall and an outside wall by spirally winding the ribbon wire. The ribbon wire comprises a narrow strip of a metal foil layer, an insulation layer coated on the surface of the metal foil layer and a fusible layer on the surface of the insulation layer. The roll is solidified to form itself by melting the fusible layer with a solvent or a hot air while the ribbon wire is being spirally wound. At least, a beginning portion of the ribbon coil is folded, and a extension of the folded portion is bent in a counter direction to the folding and extending along the inner wall of the roll so that the beginning portion forms a "S" shape bend within a space surrounded by the inner wall of the roll. The "S" shape bend is provided with an electrical terminal which is formed by removing the insulation layer and the fusible layer prior to the winding.

Other objects and further features of the present invention will be apparent from the following detailed description when read in conjunction with the accompanying drawings.

BRIEF DESCRIPTION OF THE DRAWINGS

Preferred embodiments of the present invention will be described with reference to the accompanying drawings wherein.

DETAILED DESCRIPTION OF THE PREFERRED EMBODIMENT

Figure 1:
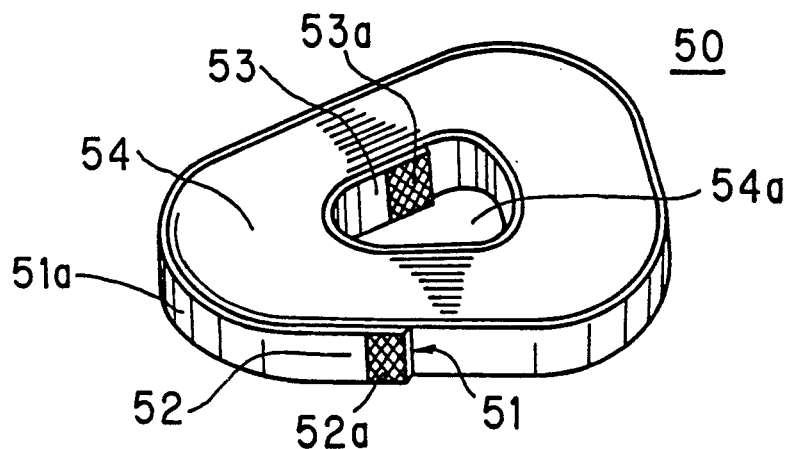
FIG. 1 is a perspective view of an example of a ribbon coil used in a motor in the prior art.
Figure 2:
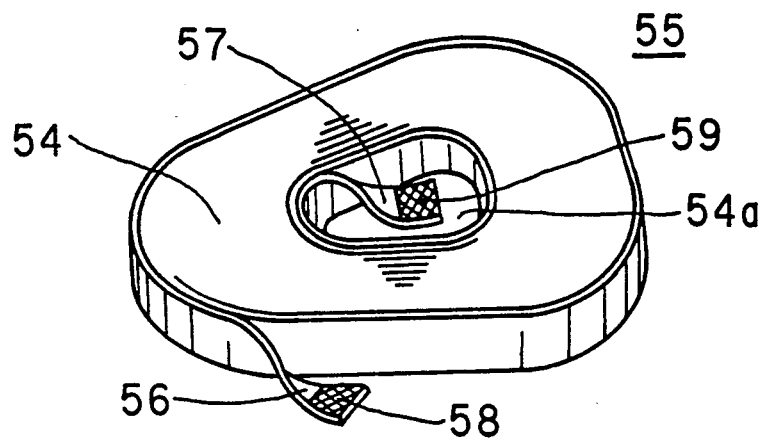
FIG. 2 is a perspective view of another example of a ribbon coil used in the motor in the prior art.
Figure 3:
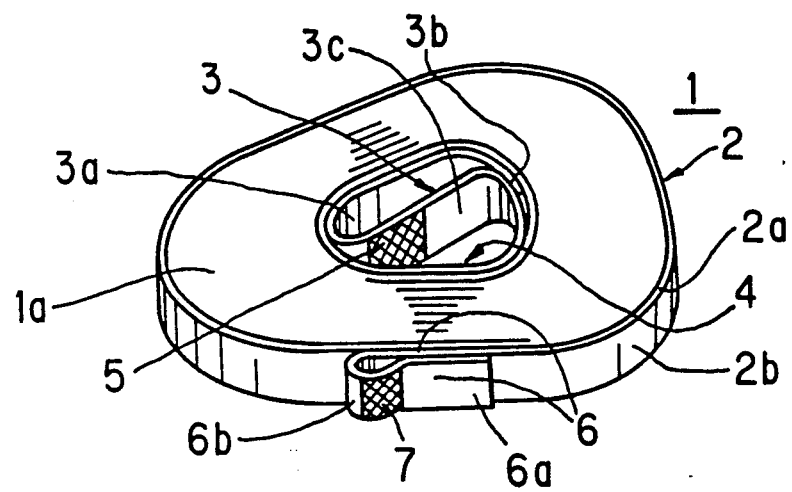
FIG. 3 is a perspective view of an embodiment of the present invention.

FIG. 3 is a perspective view of an embodiment of the present invention.

Referring to FIG. 3, as mentioned in the foregoing, a ribbon coil 1 is generally constructed as a roll 1a by winding a ribbon wire 2 spirally. The ribbon wire 2 comprises a narrow strip of a metal foil layer 2a, an insulation layer (not shown) coated on the surface of the metal foil layer 2a and a fusible layer 2b on the surface of the insulation layer (not shown). The roll 1a is solidified to form itself by melting the fusible layer 2b with a solvent or a hot air as the ribbon wire 2 is being spirally wound. At least, a beginning portion 3 of the ribbon coil 1 is folded, and a first extension 3b of a folded portion 3a is bent in a direction counter to the initial fold and is extended along an inner wall of the roll 1a so that the beginning potion 3 forms a "S" shape bend 3c within a space 4 surrounded by the inner wall of the roll 1a. The "S" shape bend 3c is provided with an electrical terminal 5 which is formed by removing the insulation layer and the fusible layer 2b prior to the winding.

Therefore, in the soldering process, it is able to connect the lead wire (not shown) directly to the electrical terminal 5 without removing the fusible layer 2b and the insulation layer.

On the other hand, and ending portion 6a is also folded to form a loop 6b, and a second extension 6a of the loop 6b is bonded to the outer surface of the roll 1a. An electrical terminal 7 may be formed on the loop 6b prior to or after the winding as it is much easier to remove the insulation layer and the fusible layer 2b with a cutter or a file than that of the "S" shape bend 3 in the space 4.

FIGS. 4 through 9 are plan views showing respective coil assembly processes of the present invention.

Next, the description will be given to the assembly processes of the ribbon coil 1 of the present invention, referring to FIGS. 4 through 9.

Figure 4:
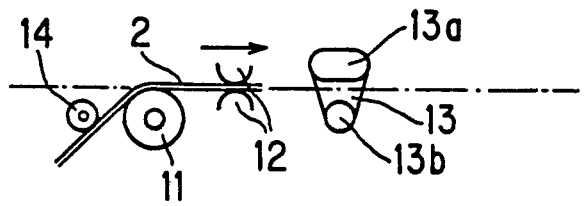
FIGS. 4 through 9 are plan views showing respective coil formation procesess of the present invention.

In the Figs., 11 designates a guide roller for guiding the ribbon wire 2, 12 a clamper for holding a distal end of the ribbon wire 2, 13 a spool jig having a pair of engaging parts 13a, 13b on which the ribbon wire is wound, which spool jig 13 is rotatably driven by a driving device (not shown), 14 a grinding wheel for removing the fusible layer 2a and the insulation layer by contacting the ribbon wire 2 as shown in FIG. 4.

In the assembly process of the ribbon coil 1, at first, the clamper 12 is positioned between the guide roller 11 and the spool jig 13. After the distal end of the ribbon wire 2 is clamped by the clamper 12 and the ribbon wire 2 is stretched between the grinding wheel 14 and another guide roller (not shown), the grinding wheel 14 is brought into contact with the surface of the ribbon wire 2 and rotated as shown FIG. 3 so that the fusible layer 2b and the insulation layer 2a at the portion corresponding to the electrical terminal 5 are removed therefrom.

Figure 5:
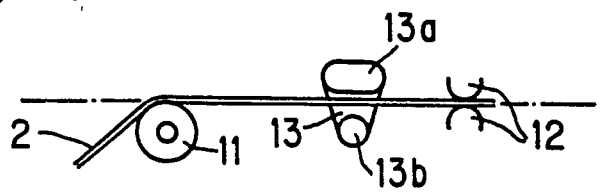
Figure 6:
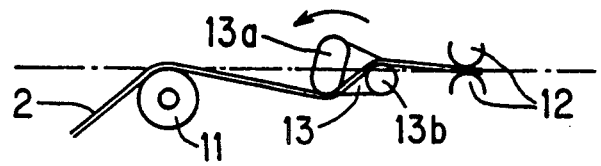
Figure 7:
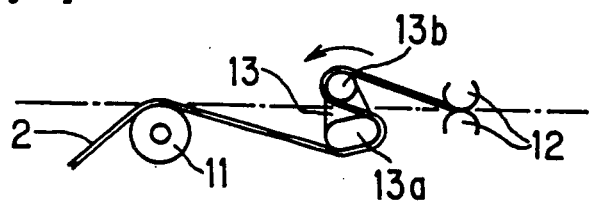
Figure 8:
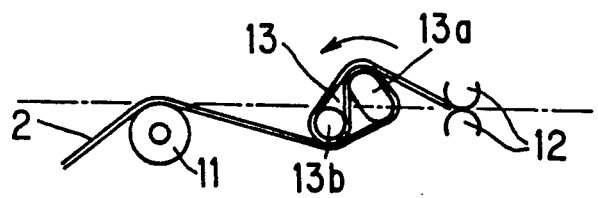
Figure 9:
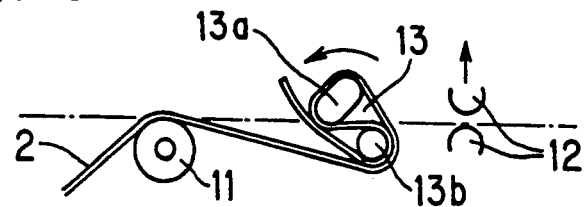

Next, the ribbon wire 2 near-by the clamp 12 holding the ribbon wire 2 is moved beyond the spool jig 13 passing between the pair of the engaging parts 13a, 13b of the spool jig 13 as indicated by the arrow (FIG. 4, FIG. 5). Then, as shown in FIG. 6, the ribbon wire 2 comes into contact with the respective surfaces of the engaging parts 13a, 13b as the spool jig 13 rotates counter-clockwise (FIG. 7), by being fed from the guide roller 11. When the spool jig 13 is further rotated in a manner that the distal end of the ribbon wire 2 is held by the clamp 12, a leading portion of the ribbon coil 2 is wound around the engaging part 13b of the spool jig 13 and a trailing portion of the ribbon wire 2 is wound around the engaging part 13a, so that the ribbon wire 2 is wound around an outer periphery of the spool jig 13 except for a portion which semicrisscrosses the engaging parts 13a, 13b as shown in FIG. 7 and FIG. 8. It should be noted that the ribbon wire 2 is tightly stretched between the pair of engaging parts 13a, 13b, and the electrical terminal 5 preformed before the winding (FIG. 3) is located between the pair. Upon the coil assembly process comes to a state as shown in FIG. 8, the clamper 12 releases its hold of the ribbon wire 2, but the spool jig 13 continues to rotate as shown FIG. 9.

It should also be noted that the wound portion around the spool jig 13 never loosens because of a friction between the two superposed layers of the ribbon wire 2 which is tightly wound around the spool jig 13.

Furthermore, the spool jig 13 is rotated as many as a predetermined turns according to the design of the ribbon coil 1 in such manner that the fusible layer 2b of the ribbon wire 2 is being melted by blowing a hot air or by feeding a solvent to fix the roll 1a. A completed ribbon coil 1 shown in FIG. 3 is thus obtained by removing it from the spool jig 13, so that the electrical terminal 5 on the beginning portion 3 is can directly be soldered with the lead wire, further, reliable solderring is performed because the solderring heat does not dissipate into the roll 1a as the electrical terminal 5 is separated from the roll 1a.

Regarding to the ending portion 6, the folded portion 6a is bonded to the roll 1a by melting then curing the fusible layer 2b by blowing the hot air or feeding the solvent. The electrical terminal 7 is easily made by removing the insulation layer and the fusible layer 2b on the folded portion 6b with a file or the like. According to the construction of the present invention, it enables to decrease an assembly or manipulating time of the wire end formation and preparation processes in the motor coil assembly and enables to obtain a reliable solderring of lead wires because the solderring heat does not dissipate into the roll of the coil. Further, the ribbon coil according to the present invention has an electrical terminal on the beginning part which is formed prior to the coil winding so that it does not pose an awkward work for removing the insulation layer and the fusible layer within a limited space surrounded by the inside wall of the coil roll, otherwise, the removing process would be very difficult and inefficient. Furthermore, it has an advantage of preventing an erroneous installation of the ribbon coil because the correct position of the folded portion of the ribbon wire is easily determined from the front and back sides of the ribbon coil, in other word, the winding direction of the ribbon coil is easily determined.

What is claimed is:

1. A roll of ribbon coil for a motor winding, said roll of ribbon coil comprising:
   a ribbon wire forming said roll, said ribbon wire being made of a strip of metal foil on which at least an insulation layer is coated, said ribbon wire being spirally wound to form said roll having an inside wall and an outside wall;
   a folded portion and an extension formed at a beginning of the ribbon wire forming said roll, said extension extended from said folded portion, being bent along said inside wall of said roll within a space surrounded by the inside wall; and
   an electrical terminal formed on said folded portion by removing said insulation layer.

2. A roll of ribbon coil as claimed in claim 1, wherein said folded portion and said extension constitutes an "S" shape bend within said space.

3. A roll of ribbon coil as claimed in claim 1, wherein an ending portion of the ribbon wire is provided with an additional folded portion, and an additional extension extended from the additional folded portion, said additional extension being bonded to said outer wall of the roll.

4. A ribbon coil as claimed in claim 3, wherein said additional folded portion is provided with an additional electrical terminal.

* * * * *